United States Patent Office 3,033,868
Patented May 8, 1962

3,033,868
DIPIPERIDYL-ALKANES
Karl Hoffmann, Binningen, and Ernst Sury, Basel, Switzerland, assignors to Ciba Pharmaceutical Products Inc., Summit, N.J., a corporation of New Jersey
No Drawing. Filed June 12, 1961, Ser. No. 116,294
Claims priority, application Switzerland Apr. 24, 1958
8 Claims. (Cl. 260—293)

This is a continuation-in-part of our application Ser. No. 793,971 filed February 18, 1959.

This invention provides $\omega:\omega'$-dipiperidyl-$\omega:\omega'$-diphenyl-alkanes of the formula

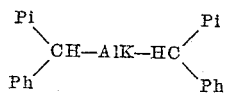

in which Ph represents a phenyl radical, Pi represents a piperidyl radical, and Alk represents an alkylene chain, advantageously containing at least 4, and at most 14, carbon atoms, as e.g. butylene, pentylene, hexylene, octylene, or decylene and also salts and quaternary ammonium compounds thereof.

The new dipiperidyl-alkanes may be substituted in the rings, for example, in the phenyl radical by halogen atoms, alkyl groups, free or substituted hydroxyl groups, such as alkoxy groups, nitro groups or amino groups. The piperidyl radical, which is bound in the 2-, 3- or 4-position to the remainder of the molecule, may be substituted at the nitrogen atom, more especially. As substituents there are preferred lower alkyl groups, such as methyl, ethyl or propyl groups, or lower hydroxy-, halogen- or amino-alkyl, and advantageously-ethyl or -propyl, groups. The amino group is preferably disubstituted by lower alkyl groups and may be, for example, a lower dialkylamino group, such as the dimethylamino or diethylamino group, or a lower alkylene-amino group. The alkylene chain may also be substituted, especially by lower alkyl groups, such as the methyl or ethyl groups.

Among the quaternary ammonium compounds there are included more especially lower alkyl-ammonium compounds the alkyl radical of which contains 1–6 carbon atoms.

The new compounds possess valuable properties. Thus, they are fungicidally active and have a tuberculostatic action, and are therefore useful as fungicides or tuberculostatics, and also as disinfecting or preserving agents. Especially valuable in this connection are the quaternary ammonium compounds.

The new compounds can be made by methods in themselves known. Thus, a dipyridyl-alkane of the formula

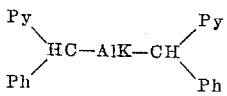

in which Ph and Alk have the meanings given above, and Py represents a pyridyl radical, may be treated with a hydrogenating agent.

The hydrogenation may be carried out with a hydrogenating agent known for hydrogenating a pyridine ring. Thus, for example, the hydrogenation may be carried out with hydrogen in the presence of a catalyst, advantageously a noble metal catalyst, such as platinum or palladium, and also the presence of nickel or copper chromite.

The secondary alkyl-piperidines may be converted by methods in themselves known into the tertiary compounds. For example, they may be alkylated in the usual manner.

Tertiary-amino-compounds obtained by the process may be quaternated in the usual manner. There are advantageously used for this purpose reactive esters of lower alkanols, such as esters of lower alkanols with strong inorganic or organic acids, for example, hydrohalic acids or aryl-sulfonic acids.

Depending on the procedure used the new compounds are obtained in the form of the bases or salts thereof. From the salts the free bases can be obtained by the methods in themselves known. From the free bases salts can be made by reaction with acids that are suitable for making industrially or therapeutically useful salts, for example, hydrohalic acids, such as hydrochloric or hydrobromic acid, sulfuric acid, nitric acid, phosphoric acid, thiocyanic acid, or organic acids, such as acetic acid, propionic acid, glycollic acid, oxalic acid, lactic acid, pyroracemic acid, malonic acid, succinic acid, maleic acid, fumaric acid, tartaric acid, citric acid, benzoic acid, cinnamic acid, salicylic acid, para-aminosalicylic acid, 2-phenoxy- or 2-acetoxy-benzoic acid, methane sulfonic acid, ethane sulfonic acid or amino-acids, such as methionine, tryptophane, lysine or argenine.

The new compounds contain asymmetrical carbon atoms so that they can be obtained in the form of racemate mixtures. These mixtures can be split up into their components by the usual methods, such as crystallization. The individual racemates can be split up by the usual methods into the optically active antipodes.

The invention also includes any modification of the process in which there is used as starting material a compound obtainable as an intermediate product at any stage of the process and the remaining steps of the process are carried out, or the process is interrupted at any stage, and the invention also includes intermediate products so obtained.

The starting materials are either known or can be made by methods in themselves known.

The new compounds can be used as medicaments in the form of pharmaceutical preparations which contain the new compound in admixture with a suitable carrier or diluent. For making pharmaceutical carriers there are used substances which do not react with the new compounds, for example, water, gelatine, lactose, starches, magnesium stearate, talc, vegetable oils, benzyl alcohols, gums, polyalkylene glycols, white petroleum jelly, cholesterol or other carrier known for medicaments. The pharmaceutical preparations may be, for example, in the form of tablets, dragees, powders, salves, creams or suppositories, or in liquid form as solutions, suspensions or emulsions. If desired, they may be sterilized and/or may contain auxiliary substances, such as preserving, stabilizing, wetting or emulsifying agents. They may also contain other therapeutically valuable substances.

The new compounds are also useful as disinfecting or preserving agents, for example, for disinfecting the skin, for example, the hands, or instruments, laundry goods or the like, and also for disinfecting or preserving foodstuffs. They may be used alone or mixed together in solution or as emulsions and/or with other active or inert substances, in the form of salves, or in the form of dry powders.

The following examples illustrate the invention:

*Example 1*

A solution of 20 grams of $\omega:\omega'$-dipyridyl-(2)-$\omega:\omega'$-diphenyl-dodecane in 100 cc. of glacial acetic acid is agitated with 1 gram of platinum oxide in an atmosphere of hydrogen at 25° C. When the theoretical quantity of hydrogen has been absorbed, the catalyst is filtered off, the solution is evaporated, the residue is dissolved in water, the solution is rendered alkaline with caustic soda solution, and the precipitated oil is extracted with ether. After evaporating the ether, there remains behind ω:ω'-dipiperidyl-(2)-ω:ω'-diphenyl-dodecane of the formula

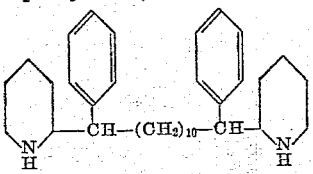

in the form of an oil boiling at 275–285° C. under 0.1 mm. pressure. The base dissolves in dilute hydrochloric acid to form its dihydrochloride.

The above mentioned starting material can be obtained by condensing 40 grams of phenyl pyridyl-(2)-aceto-nitrile, 8.6 grams of sodamide and 33 grams of 1:10-dibromodecane in 200 cc. of absolute dioxane followed by hydrolysis and decarboxylation with sodium hydroxide or potassium hydroxide at 220° C. or with sulfuric acid of 75–80% strength at 150–160° C.

Example 2

28 grams of ω:ω'-dipyridyl-(2)-ω:ω'-diphenyl-dodecane bis-methosulfate (obtained by boiling 21 grams of ω:ω'-dipyridyl-(2)-ω:ω'-diphenyl-2-dodecane for one hour with 12 grams (=9 cc.) of dimethyl sulfate in 100 cc. of methanol and evaporating the solvent in vacuo) are dissolved in 120 cc. of alcohol, and hydrogenated with 1 gram of platinum oxide in hydrogen at 25° C. When the calculated quantity of hydrogen has been absorbed, the catalyst is filtered off, the solvent is evaporated, the residue is dissolved in water, the solution is rendered alkaline with caustic soda solution, and the liberated base is extracted with ether.

By evaporating the ether there is obtained ω:ω'-1:1'-dimethyl-dipiperidyl-(2)-ω:ω'-diphenyl-dodecane of the formula

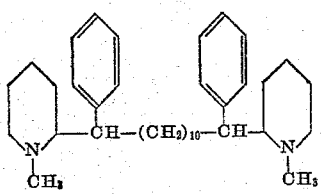

in the form of an oil boiling at 263–267° C. under 0.1 mm. pressure.

Example 3

17 grams of ω:ω'-1:1-dimethyl-dipiperidyl-(2)-ω:ω'-diphenyl-dodecane obtainable as described in Example 2 are quaternated with 15 grams of methyl bromide in 100 cc. of ethyl acetate at 30–40° C. for 3 hours. The dibromo-methylate of ω:ω'-1:1'-dimethyl-dipiperidyl-(2)-ω:ω'-diphenyl-dodecane of the formula

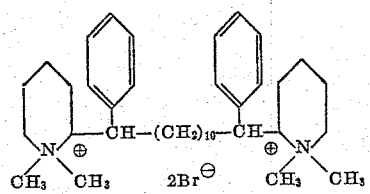

melts at 138–140° C. with decomposition.

In a manner analogous to that described in Example 1 the following compounds can be made:

ω'ω'-dipiperidyl-(2)-diphenyl-hexane—melting at 102–103° C. (from petroleum ether).

ω:ω'-dipiperidyl-(2)-diphenyl-heptane—boiling at 240–242° C. (0.1 mm. pressure).

ω:ω'-dipiperidyl-(2)-diphenyl-octane—melting at 77–78° C. (from petroleum ether).

ω:ω'-dipiperidyl-(2)-ω:ω'-di-p-chlorophenyl-dodecane—boiling at 303–306° C. (0.1 mm. pressure).

ω:ω'-dipiperidyl-(2)-ω:ω'-di-p-methoxy-phenyl-dodecane—boiling at 318–320° C. (0.3 mm. pressure).

The following compounds are obtained in a manner analogous to that described in Example 2:

ω:ω'-1:1'-dimethyl-dipiperidyl-(2)-ω:ω'-diphenyl-hexane—melting at 96–97° C.

ω:ω'-1:1'-dimethyl-dipiperidyl-(2)-ω:ω'-diphenyl-heptane—boiling at 242–245° C. (0.1 mm. pressure).

ω:ω'-1:1'-dimethyl-dipiperidyl-(2)-ω:ω'-diphenyl-octane—boiling at 249–253° C. (0.1 mm. pressure).

ω:ω'-1:1'-dimethyl-dipiperidyl-(2)-ω:ω'-di-p-chlorophenyl-dodecane—boiling at 300–305° C. (0.1 mm. pressure).

ω:ω'-1:1'-dimethyl-dipiperidyl-(2)-ω:ω'-di-p-methoxyphenyl-dodecane—boiling at 288–293° C. (0.1 mm. pressure).

The following compounds are obtained in a manner analogous to that described in Example 3:

ω:ω'-1:1'-dimethyl-dipiperidyl-(2)-ω:ω'-diphenyl-hexane-bis-methobromide—melting at 137–138° C. (with decomposition).

ω:ω'-1:1'-dimethyl-dipiperidyl-(2)-ω:ω'-diphenyl-heptane-bis-methobromide—melting at 146–148° C. (with decomposition).

ω:ω'-1:1'-dimethyl-dipiperidyl-(2)-ω:ω'-diphenyl-octane-bis-methobromide—melting at 256–257° C. (with decomposition).

ω:ω'-1:1'-dimethyl-dipiperidyl-(2)-ω:ω'-di-p-chlorophenyl-dodecane-bis-methobromide—melting at 145–147° C. (with decomposition).

ω:ω'-1:1'-dimethyl-dipiperidyl-(2)-ω:ω'-di-p-methoxyphenyl-dodecane-bis-methobromide—melting at 178–180° C. (with decomposition).

What is claimed is:

1. A member selected from the group consisting of ω:ω'-dipiperidyl-ω:ω'-diphenylalkanes of the formula

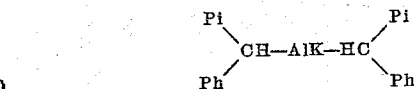

wherein Ph represents a member selected from the group consisting of phenyl, halogeno-phenyl, alkyl-phenyl, alkoxy-phenyl, nitro-phenyl and amino-phenyl, Pi a member selected from the group consisting of piperidyl, lower alkyl-piperidyl, lower hydroxy-alkyl-piperidyl, lower halogeno-alkyl-piperidyl and lower amino-alkyl-piperidyl, and Alk an alkylene group having from 4 to 14 carbon atoms, therapeutically useful acid addition salts thereof and lower alkyl quaternary ammonium compounds thereof.

2. Compounds of the formula

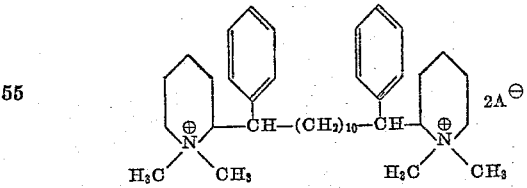

wherein $A^{\ominus}$ represents an anion selected from the group consisting of the anion of hydrohalic acid, the anion of sulfuric acid and the anion of aryl sulfonic acid.

3. ω:ω'-Dipiperidyl-(2)-ω:ω'-diphenyl-dodecane.

4. ω:ω'-1:1'-Dimethyl-dipiperidyl-ω:ω'-diphenyl-dodecane.

5. Therapeutically useful acid addition salts of the compound claimed in claim 3.

6. Therapeutically useful acid addition salts of the compound claimed in claim 4.

7. ω,ω'-1:1'-dimethyl-dipiperidyl-(2)-ω:ω'-di-p-chlorophenyl-dodecane.

8. ω,ω'-1:1'-dimethyl-dipiperidyl-(2)-ω:ω'-di-p-chlorophenyl-dodecane bis-methobromide.

No references cited.